Figure 1:
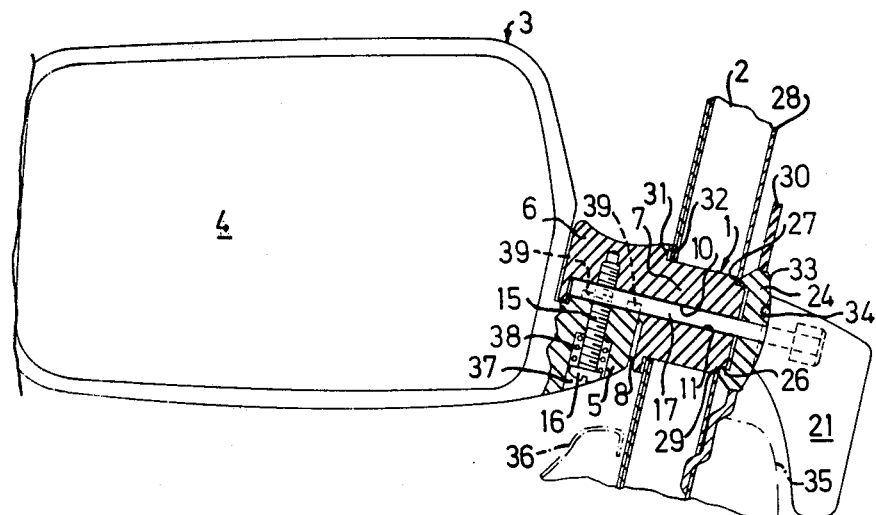

United States Patent [19]

Pilhall

[11] 4,213,675
[45] Jul. 22, 1980

[54] INTERIORLY ADJUSTABLE OUTSIDE REAR VIEW MIRROR FOR VEHICLES

[75] Inventor: Stig T. L. Pilhall, Trollhättan, Sweden

[73] Assignee: AB Volvo, Goteborg, Sweden

[21] Appl. No.: 27,090

[22] Filed: Apr. 4, 1979

[30] Foreign Application Priority Data

Apr. 19, 1978 [SE] Sweden .............................. 7804455

[51] Int. Cl.² .............................................. G02B 5/08
[52] U.S. Cl. .................................... 350/307; 248/478; 248/487; 74/491
[58] Field of Search ................ 350/307; 248/487, 485, 248/475 R, 475 B, 476–479; 74/491

[56] References Cited

U.S. PATENT DOCUMENTS

| | | | |
|---|---|---|---|
| 2,260,597 | 10/1941 | Beattie | 74/491 |
| 2,315,260 | 3/1943 | Lancaster | 74/491 |
| 2,341,208 | 2/1944 | Clark et al. | 74/491 |
| 2,644,363 | 7/1953 | Capitani | 74/491 |
| 2,674,922 | 4/1954 | Robinson | 74/491 |
| 2,740,329 | 4/1956 | Morgenstern | 74/491 |
| 2,746,355 | 5/1956 | Wells | 74/491 |
| 2,746,356 | 5/1956 | Wells | 74/491 |
| 2,902,902 | 9/1959 | Slone | 74/491 |

FOREIGN PATENT DOCUMENTS

| | | | |
|---|---|---|---|
| 2262548 | 6/1974 | Fed. Rep. of Germany | 74/491 |
| 2360823 | 6/1974 | Fed. Rep. of Germany | 350/307 |
| 2361756 | 6/1975 | Fed. Rep. of Germany | 74/491 |
| 2612631 | 10/1976 | Fed. Rep. of Germany | 248/487 |
| 1431778 | 4/1976 | United Kingdom | 248/475 B |

*Primary Examiner*—Jon W. Henry
*Attorney, Agent, or Firm*—Young & Thompson

[57] ABSTRACT

A device for manually adjusting the setting of an outside vehicle rear view mirror by manually operating a grip member provided in the interior of the vehicle. The device comprises a generally cylindrical holder body rotatably but axially non-displaceably mounted in a through-hole in a front door of the vehicle. In a cavity within the holder body there is pivotally disposed an adjustment arm having a first end portion situated on the outside of the door and carrying the mirror, and a second end portion protruding through a slot in an end cover being biased towards the inside end of the holder body and against the inner surface of the door. On said second end portion the arm carries a grip member on the inside of the door, this member being manually displaceable over the surface of end cover for pivoting the arm horizontally and thereby adjusting the mirror horizontally. When said grip member is turned about the longitudinal axis of the arm the holder body will be rotated thereby adjusting the mirror vertically.

7 Claims, 2 Drawing Figures

U.S. Patent  Jul. 22, 1980  4,213,675

INTERIORLY ADJUSTABLE OUTSIDE REAR VIEW MIRROR FOR VEHICLES

The present invention relates to an adjustment device, with the aid of which a mirror housing for a vehicle rear view mirror carried on the outer side of the vehicle at one end of the device is manually adjustable within the interior of the vehicle, said device comprising a holder body rotatably mounted in and extending through a through-hole in a wall portion associated with the vehicle body, e.g. a front door.

Incorrectly adjusted mirrors on vehicles can cause deteriorated traffic safety, since they result in the available field of view not being utilized optimally.

For example, when an individual driver needs to adjust the driving seat in different positions for different kinds of driving, and where the vehicle is used by several drivers, it is obvious that their different body sizes require, inter alia, readjustment of the outside rear view mirrors to suit the driver concerned. It is therefore important that such mirrors are easily adjustable by manually actuated means provided in the interior of the vehicle.

Known adjustment devices of the kind described in the introductory paragraph, and similar such devices generally constitute relatively complicated structures, which are comparatively difficult to operate in many cases.

The primary object of the invention is to provide a simple, robust and functionally reliable adjustment device, which is purely mechanical and comprises only a few parts easy to fit to the appointed bodywork portion (usually a front door) and which does not demand fitting any extra details to the wall portion, but only requires the existence of a cylindrical through-hole in the wall portion. The structure of the device shall furthermore be such that it only requires tightening a single member for fitting the device in the through-hole. The degree of tightening of this member, which is suitably a set screw, shall furthermore be that which determines the frictional resistance or resistance to movement in both directions of movement of the device, i.e. pivoting the mirror about an at least substantially vertical axis for changing the field of view horizontally (sideways), and rotating the mirror about an at least substantially horizontal axis for changing the field of view vertically (height adjustment).

The mirror shall furthermore be adjusted using mutually logical movements, of the manually operated grip portion of the device and the mirror housing in which the mirror is assumed to be firmly fixed. In this respect it is intended that the grip portion and the mirror housing/mirror will move in the same direction for an alteration in the mirror adjustment.

So that the mirror adjustment can be altered, inter alia while driving, it is essential not least from the point of view of traffic safety, that the movement of the mirror in both its directions of movement can take place by manual actuation of one and the same grip portion, so that the alteration of the mirror can easily be carried out with one hand without changing grip. Both movements should thus be such as require turning or pivoting about an axis.

The said objects are obtained in accordance with the invention by the holder body being axially fixed in the through-hole by means of stop means abutting against at least two surfaces associated with the body wall portion and facing in opposite directions, at least one of the stop means being arranged on the holder body, and that in the holder body there is provided a cavity wherein there is pivotally disposed an arm having an outer portion situated outside the body wall portion, said outer portion being torque transmitting interconnected with the mirror housing for pivoting movement thereof in relation to the holder body, and an inner portion protruding from the end of the holder body on the inner side of the body wall portion, there to carry a grip portion which, by means of an adjusting means attached to the arm, is biased against a stop portion disposed at the end of the holder body, one of the stop means being rigidly attached to said stop portion.

Alteration of the field of view horizontally (sideways) thus takes place by substantially horizontal displacement of the grip portion in relation to the stop means, said movement causing pivoting of the arm and thereby also pivoting of the mirror housing (mirror) in relation to the holder body, thus also relative to the body wall portion. Vertical alteration of the field of view (height adjustment) takes place by turning the grip portion and the arm non-rotatably attached thereto about the longitudinal axis of the latter, said movement causing rotation of the entire holder body in the through-hole (i.e. relative to the body wall portion). The mirror housing (and thus the mirror also) attached to the holder body is then turned just as much as the holder body.

With the device in accordance with the invention, the mirror housing/mirror is thus manoeuvered directly with the help of the arm, which of course carries the mirror housing on the outside of the body wall portion and inside thereof carries the grip portion. Since the arm can be made comparatively long in this way, such good leverage is obtained that no gearing mechanism or the like is required for the sideways adjustment of the mirror.

One of the conditions for an outside rear view mirror mounted on a front door of a vehicle is naturally that the through-hole is situated in an area of the door which does not contain a window which can be moved by cranking up and down. Normally, it will thus be a question of placing the through-hole in the forward edge or the forward portion of the door.

Although adjustment of the mirror in both its directions of movement can thus take place by operating one and the same part, namely the grip portion, it is also conceivable that the grip portion is only used for pivoting the mirror in relation to the holder body, while rotation of the holder body, i.e. alteration of the height adjustment, takes place by rotating the stop means, which is thus made as a round cover with an easily gripable edge, for example. The turning motion is then transferred from the cover to the holder body by having these two parts non-rotatably connected with each other.

The arm can, per se, be so formed that the torque applied to the arm by the grip portion for turning the mirror housing, is transferred directly to the housing via the arm. However, this requires that the arm has a comparatively high torsional rigidity.

A considerably weaker arm (having a lower torsional rigidity) may be satisfactory, however, if it is guided with comparatively minor clearance in the holder body, i.e. in the holder body cavity, so that a stiff torque transferring engagement between it and the holder body will occur after insignificant twist of the arm. The majority of the torque applied to the arm will thus be transferred to the mirror housing via the holder body itself.

A suitable embodiment of the adjustment device, with this in mind, is characterized in that the cavity in the holder body has two substantially parallel opposing wall surfaces, and that in the portion of the holder body situated outside the body wall portion there is fixed a pin transversely to the longitudinal axis of the body, said pin extending through the outer part of the cavity, the arm being pivotably mounted on the pin and guided in its pivoting movement between said wall surfaces of the cavity, the mirror housing being in engagement with the outer portion of the arm situated in the region of the pin.

A preferred embodiment of the adjustment device in accordance with the invention is further characterized in that the holder body is outwardly cylindrical in the area between the stop means, the cavity constituting a slot between the cavity walls parallel to the longitudinal axis of the body, the end of said slot outside the body wall portion being defined by an arcuate wall surface about the pin, and that the arm is an elongate plate portion, the width of which, measured in the plane of the slot, decreases from the arm end at the pin towards the arm end at the grip portion, and the stop portion consisting of a cover with a slot-like opening through which the arm extends, the end portion of the arm carrying the grip portion being situated outside said opening.

The advantage, inter alia that the through-hole in the respective body wall portion, e.g. a front door, can be made small, is thus attained, since the diameter of the holder body can be small.

It is further suitable that the cover has an edge flange with which it projects in over the contiguous end of the holder body, there being a flat, annular surface on the edge flange by means of which the cover is in contact with the body wall portion.

The size of the flat, annular surface and the size of the stop surface abutting the outside of the body wall portion on the outside of the holder body will be the deciding factor, together with the axial tightening force for the device provided by the adjusting means, for the torque which must be applied to the holder body (via the grip portion) to provide turning of the holder body in the through-hole. Said surfaces are formed in such a way that suitable friction characteristics are obtained between them and the body wall portion, and this can be provided by a spacer of suitable material, e.g. nylon being inserted between the surfaces and the body wall portion.

A certain minimum stiffness in the rotational mounting of the holder body is naturally required for the mirror not to shake out of its adjusted position as a result of such vibrations or shocks in the vehicle occurring during driving.

The portion of the holder body outside the body wall portion is suitably provided with a recess around the pin, extending into the cavity, the mirror housing being connected with the arm by a boss-like portion associated with the housing, said boss-like portion being pivotally mounted on the pin and being in pretensioned or biased engagement with the arm at its forward end in the region of the pin.

The recess can be placed in the lower or upper half of the holder body, the boss-like portion on the mirror housing connecting to the holder body from below and above, respectively. An embodiment where the mirror housing connects to the holder arm from below would, however, be most often preferable since effective sealing between the housing and the body is then easier to achieve.

From the point of view of safety, and to facilitate automatic washing of the vehicle, for example, the mirror housing must be so attached to the arm that it can be swung away about the pin when it is subjected to a sufficiently large force. This means that the mirror housing should be enabled to snap towards the body wall portion (forward or rearwards) when a certain force is applied. The mirror housing is therefore in spring-biased snap engagement with the arm by means of projections on the boss portion which are in engagement with corresponding recesses in the arm on the portion of it exposed at the bottom of the recess, so that the housing can snap away on the application of a transverse force from the rear or from the front.

In a suitable embodiment of the adjustment device, the cover has a convex, cylindrical or spherically curved outer surface, the grip portion having a mating concave, cylindrical or spherically curved surface in contact with the outer surface of the cover, whereby the necessary contact between the cover and the grip portion is maintained when said grip portion is moved over the cover to pivot the arm in the slot for adjusting the mirror in relation to the body wall portion.

The centre of curvature for the outer surface of the cover and the contact surface of the gripping portion is thus at the axis of the pin, so that effective sealing contact/frictional action is maintained between the cover and the grip portion in the different attitudes of adjustment of the mirror.

The axial fixation of the holder body in the through-hole is provided, as is described above, by means of stop means arranged on the holder body and on the stop portion. When the body wall portion consists of a more or less solid structure, e.g. a sandwich panel, an abutment surface is arranged on the stop means on the holder body, so disposed to engage with the outer surface of the body wall portion. On the other hand, when the body wall portion consists of a more conventional structure with sheets forming the outside as well as the inside of the wall portion, it is suitable that the stop means of the holder body comprise a first annular abutment surface for engagement against the outer surface of the body wall portion, and a second annular abutment surface spaced from the inner end of the body, said second surface being disposed for contact with one side of a sheet on the inside of the body wall portion, the flat annular surface of the cover being pressed against the other side thereof.

The fixing force generating all of the turning resistance of the holder body having to be taken up over the entire thickness of the body wall portion is hereby avoided. With such an embodiment there is also the advantage that the friction conditions on the outer surface of the body wall portion will be less important for the rotatable mounting of the holder body in the wall portion. This is a definite advantage, since the outer surface of the body wall portion is subjected to the effect of climate, which can result in altered friction conditions between it and the abutting surface. It is also conceivable entirely to dispense with stop means determining friction on the outer surface of the body wall portion, and only arrange such disposed for acting against a sheet on the inside of the body wall portion, for example, the annular surface of the cover being disposed for pressing against the opposite side of said sheet.

The invention will now be further explained and exemplified while referring to an embodiment of the adjustment device shown on the accompanying drawing, when the device is conceived as mounted on the front edge of a vehicle door, and intended as an outside rear view mirror.

Figure 2:
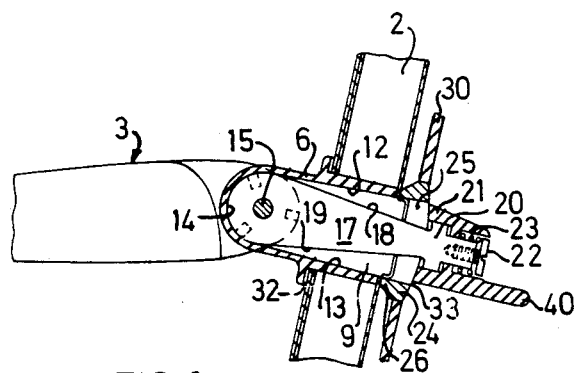

On the drawing, FIG. 1 is a vertical section through a door to which the device is fitted, and FIG. 2 shows a horizontal projection and partial section of the adjustment device in FIG. 1.

The adjustment device generally denoted by the numeral 1 on the drawing is mounted in a cylindrical through-hole in the forward portion of a vehicle door, of which a portion 2 is shown in FIGS. 1 and 2. On the part of it situated on the outside of the door portion 2, the adjustment device 1 carries a mirror housing 3, adjustable in the interior of the vehicle, there being a rear view mirror 4 fixed to the housing 3. The housing 3 has a boss-like portion 5 with which the housing is connected to the outer portion of the adjustment device 1 from below. The attachment of the housing 3 to the device 1 is described in detail below.

The adjustment device 1 comprises a holder body 6 having a cylindrical portion 7, by means of which the body 6 is rotatably mounted in the cylindrical hole in the door portion 2. Downwardly in the outer portion of the holder body 6 there is a recess 8 for the boss-like portion 5 of the housing 3.

In the interior of the holder body 6 there is an axially extending slot-like cavity 9 defined by two parallel, opposing upper and lower wall surfaces 10,11, two opposing side wall surfaces 12,13 and an arcuate wall surface 14 in the outer portion of the holder body 6. The body 6 has a screw or pin 15 screwably accommodated in its outer portion and directed transversely to its longitudinal axis. The pin 15, suitably having the form of a screw with a head 16, extends through the outer portion of the cavity 9 and continues out into the recess 8 where the pin is surrounded by the boss-like portion 5 of the mirror housing 3. An elongate plate-like arm 17 is pivotably mounted on the pin 15 and pivotably movable (in its own plane) in the cavity 9 between the side wall surfaces 12,13 of the latter. To accommodate for the pivoting movement of the arm 17 within the cavity 9, the arm is formed tapering towards the inside of the vehicle. The side edges 18,19 of the arm thus converge towards an end portion 20 situated outside the end of the holder body 6 on the inside of the door portion 2. The end portion 20 carries a handle or grip portion 21, accessible within the vehicle interior, and biased against a stop portion 24 by means of a helical spring 23 and a set screw 22 screwed into the end of the portion 20, said stop portion 24 being formed as a round cover arranged at, and mounted on, the free end of the cylindrical portion 7 of the holder body 6. The cover 24 has a slot-like opening 25 through which the arm 17 protrudes, and outside which is situated the end portion 20 carrying the grip portion. The cover 24 has an edge flange 26 with which the cover projects in over the free end of the cylindrical portion 7, and on the edge flange 26 there is a flat, annular surface 27 by means of which the cover is in contact with a sheet 28 on the inside of the door portion 2. The cylindrical portion 7 of the holder body 6 has an annular abutment surface 29 opposing the annular surface 27, said abutment surface 29 being contiguous to the side of the sheet 28 opposite to the cover 24.

The numeral 30 denotes in the figures parts of upholstery attached to the inside of the door and having a round hole in which the cover 24 is freely rotatable.

The holder body 6 is axially fixed in the through-hole by means of the annular surface 27 of the cover 24 and the annular abutment surface 29 on the cylindrical portion 7, and by an annular abutment surface 31 putting the holder body in contact with the outer surface of the door portion 2. Between the abutment surface 31 and the outer surface of the door portion 2 there is suitably inserted a flat ring 32 of some suitable material, e.g. nylon, to serve as a friction and sealing member. The desired resistance to turning the holder body 6 in the through-hole is obtained by a suitable selection of the sizes of the surfaces 27,29 and 31 (as well as the selection of a suitable material in the spacer 32), and the size of the pretensioning or biasing force caused by the set screw 22 and helical spring 23 on the cover 24 via the grip portion 21. The resistance to turning of the holder body 6 in the through-hole can also be influenced by selection of the material in the cover 24. A material which would be suitable is plastics, whereby the cover will also be able to function as a sealing washer against the sheet 28.

The cover 24 has a convex outer surface 33 which is either cylindrically or spherically curved. The grip portion 21 has a complementary concave, cylindrical or spherically curved contact surface 34 abutting against the outer surface 33 of the cover. By said configuration of the surfaces 33,34 there is ensured the necessary contact between the cover 24 and the grip portion 21, independent of the actual adjustment state of the grip portion 21 in relation to the cover 24. In this connection, it can be mentioned that the dashed contour 35 adjacent the lower portion of the grip portion 21 denotes portions of the door of no significance to the invention, this also applying to the dashed contour 36, on the outside of the door, denoting an outer sheet forming part of the door.

As already pointed out above, the boss-like portion 5 of the mirror housing 3 is pivotably mounted on the pin 15 fixed in the holder body 6. The boss portion 5 is biased or pretensioned to engagement with the arm 17 by means of a helical spring 38 compressed between the bottom of a hole 37 and the head 16 of the pin or screw 15. The engagement configuration between the boss 5 and the arm 17 comprises a plurality of projections 39 (shown in contour with dashed lines in FIG. 1) rigidly attached to the boss, and complementary recesses to these projections on the underside of the arm 17 in the region of and around the pin 15. By means of the spring-biased engagement between the boss portion 5 and the arm 17 in the holder body 6, the mirror housing 3 can be swung or "snapped" in towards the side of the door when required, this retraction being required partly for reasons of traffic safety, and partly so that the mirror housing can be put into an out-of-the-way retracted position to facilitate automatic washing of the vehicle, for example.

As already pointed out in the general part of the description, alteration of the field of view in height is achieved by rotating the adjustment device 1, whereby the cylindrical portion 7 of the holder body 6 is subjected to turning in the cylindrical through-hole in the door. The turning operation is carried out in the interior of the vehicle by gripping the vertical portion 40 of the grip portion 21, e.g. with the fingers, and rotating the grip portion about the centreline of the arm 17. The turning or rotating movement is transferred from the grip portion 21 to the arm 17 by the grip portion 21 being non-rotatably accommodated on the end portion 20 of the arm.

In this connection it may be pointed out that the grip portion 21 should be given a form such that said portion, independent of how it is disposed in relation to the cover 24, is outside the so-called impact area for the head of the person who is sitting in the seat adjacent the door in which the device 1 is mounted.

The adjustment of the mirror housing 3 for altering the rear view laterally is done, as is also apparent from the general part of the description, by the grip portion 21 being displaced in relation to the cover 24, whereby the arm 17 is pivoted in the cavity 9, the housing 3 accompanying this pivoting movement. As a matter of form, it should be pointed out that said two main directions of movement of the mirror housing 3 will not be entirely separately available unless the arm 17, or in other words the holder body 6, is arranged entirely horizontally in the door. Since the door portion 2 generally utilized will have a certain inclination for most automobile models, there is a certain superimposition of both movements for the mirror 4 when operating the grip portion 21, although this is entirely unessential in effect.

It will only be pointed out finally that the adjustment device in accordance with the invention, apart from the advantages set forth in the general part of the description, is also distinguished in that it is cheap, can be made in a standard embodiment for a plurality of different automobile models, does not require any predetermined torque adjustment in the fitting operation on the respective automobile, causes insignificant wind noise, has low air resistance and minor weight.

What I claim is:

1. An adjustment device, with the aid of which a mirror housing for a vehicle rear view mirror carried on the outer side of the vehicle at one end of the device is manually adjustable within the interior of the vehicle, said device comprising a holder body rotatably mounted in an extending through a through-hole in a wall portion associated with the vehicle body, e.g. a front door, characterized in that the holder body is axially fixed in the through-hole by means of stop means abutting against at least two surfaces associated with the body wall portion and facing in opposite directions, at least one of the stop means being arranged on the holder body, and that in the holder body there is provided a cavity wherein there is pivotally disposed an arm having an outer portion situated outside the body wall portion, said outer portion being torque transmitting interconnected with the mirror housing for pivoting movement thereof in relation to the holder body, and an inner portion protruding from the end of the holder body on the inner side of the body wall portion, there to carry a grip portion which, by means of an adjusting means attached to the arm, is biased against a stop portion disposed at the end of the holder body, one of the stop means being rigidly attached to said stop portion.

2. An adjustment device as claimed in claim 1, characterized in that the cavity in the holder body has two substantially parallel opposing wall surfaces and that, in the portion of the holder body outside the wall body portion, a pin is fixed transversely to the longitudinal axis of the body, said pin extending through the outer part of the cavity, the arm being pivotally mounted on the pin and having its pivotal motion guided between said wall surfaces of the cavity, the mirror housing being in engagement with the outer portion of the arm in the region of the pin.

3. An adjustment device as claimed in claim 2, characterized in that the holder body is externally cylindrical in the area between the stop means, the cavity constituting a slot parallel to the longitudinal axis of the body, between the opposing wall surfaces in the cavity, the end of said slot situated outside the body wall portion being defined by an arcuate wall surface about the pin and that the arm is an elongate plate portion with a width, measured in the plate of the slot, decreasing from the arm end at the pin towards the arm end at the grip portion, the stop portion constituting a cover with a slot-like opening through which the arm extends, the end portion of the arm carrying the grip portion being situated outside said opening.

4. An adjustment device as claimed in claim 3, characterized in that the cover has an edge flange with which it projects in over the contiguous end of the holder body, there being a flat, annular surface on the edge flange, by means of which the cover is in contact with the body wall portion.

5. An adjustment device as claimed in claim 2, characterized in that the portion of the holder body situated outside the body wall portion is provided with a recess around the pin, said recess extending inwardly to the cavity, the mirror housing being connected to the arm by a boss-like portion associated with the housing, said boss-like portion being pivotally mounted on the pin and at its forward end being in biased engagement with the arm in the region of the pin.

6. An adjustment device as claimed in claim 3, characterized in that the cover has a convex, cylindrical or spherically curved outer surface, the grip portion having a complementary concave, cylindrical or spherically curved contact surface in contact with the outer surface of the cover, by which means the necessary contact between the cover and grip portion is maintained when said grip portion is moved over the cover to pivot the arm in the slot, thereby to adjust the mirror in relation to the vehicle body wall portion.

7. An adjustment device as claimed in claim 4, characterized in that the stop means of the holder body comprise a first annular abutment surface for abutting against the outer surface of the body wall portion, and a second annular abutment surface spaced from the inner end of the body, said second abutment surface being disposed for contact with one side of a sheet on the inside of the body wall portion, the flat, annular surface of the cover being kept pressed against the opposite, second side of said sheet.

* * * * *